(12) United States Patent
Yi et al.

(10) Patent No.: US 11,451,436 B2
(45) Date of Patent: Sep. 20, 2022

(54) METHOD AND APPARATUS FOR HANDLING MULTIPLE NUMEROLOGIES IN WIRELESS COMMUNICATION SYSTEM

(71) Applicant: LG Electronics Inc., Seoul (KR)

(72) Inventors: Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 16/621,856

(22) PCT Filed: Jul. 6, 2018

(86) PCT No.: PCT/KR2018/007698
§ 371 (c)(1),
(2) Date: Dec. 12, 2019

(87) PCT Pub. No.: WO2019/009665
PCT Pub. Date: Jan. 10, 2019

(65) Prior Publication Data
US 2021/0092008 A1 Mar. 25, 2021

Related U.S. Application Data

(60) Provisional application No. 62/529,450, filed on Jul. 6, 2017, provisional application No. 62/557,125, filed on Sep. 11, 2017.

(51) Int. Cl.
*H04L 41/0803* (2022.01)
*H04J 1/02* (2006.01)
(Continued)

(52) U.S. Cl.
CPC ............ *H04L 41/0803* (2013.01); *H04J 1/02* (2013.01); *H04W 72/0453* (2013.01); *H04W 72/12* (2013.01)

(58) Field of Classification Search
CPC .............. H04L 41/0803; H04W 72/12; H04W 72/0453; H04J 1/02
See application file for complete search history.

(56) References Cited

U.S. PATENT DOCUMENTS

2013/0242778 A1* 9/2013 Geirhofer ............. H04W 24/10
370/252
2016/0352551 A1 12/2016 Zhang et al.
(Continued)

FOREIGN PATENT DOCUMENTS

EP          3513611          7/2019
WO      2018084571 A1       5/2018
WO       18231971 A1       12/2018

OTHER PUBLICATIONS

62374354,Specification,Aug. 12, 2016 (Year: 2016).*
(Continued)

*Primary Examiner* — Un C Cho
*Assistant Examiner* — Yu-Wen Chang
(74) *Attorney, Agent, or Firm* — Dentons US LLP

(57) ABSTRACT

A method and apparatus for configuring a data subband set in a wireless communication system is provided. A user equipment (UE) configures at least one data subband set within a carrier, and communicating with a base station by using the at least one data subband set. Each of the at least one data subband set consists of at least one data subband, and each of the at least one data subband consists of a set of consecutive physical resource blocks (PRBs). Each of the at
(Continued)

least one data subband set may be configured per numerology. The at least one data subband may correspond to at least one bandwidth part (BWP).

10 Claims, 13 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2018/0049169 A1* | 2/2018 | Lin | H04L 5/0094 |
| 2018/0343154 A1* | 11/2018 | Park | H04L 5/005 |
| 2019/0123864 A1* | 4/2019 | Zhang | H04B 7/024 |
| 2019/0230549 A1* | 7/2019 | Wang | H04L 1/0026 |
| 2020/0037260 A1* | 1/2020 | Fu | H04W 52/325 |
| 2020/0077432 A1* | 3/2020 | Xiong | H04L 1/1825 |
| 2020/0112944 A1* | 4/2020 | Jiang | H04W 72/042 |
| 2020/0119896 A1* | 4/2020 | Li | H04W 72/0453 |
| 2020/0120488 A1* | 4/2020 | Liu | H04L 5/00 |
| 2020/0177254 A1* | 6/2020 | Lee | H04B 7/0639 |
| 2020/0344034 A1* | 10/2020 | Moon | H04L 5/0092 |
| 2020/0344761 A1* | 10/2020 | Amuru | H04L 5/0007 |
| 2021/0258996 A1* | 8/2021 | Xu | H04L 5/0094 |

OTHER PUBLICATIONS

62520878,Specification (Year: 2017).*
62519705,Specification (Year: 2017).*
62518848,Specification (Year: 2017).*
Intel Corporation, "Bandwidth parts configuration and operations", 3GPP TSG RAN WG1 Meeting #89, May 15-19, 2017, R1-1707420.
OPPO, Ericsson, [Huawei], [HiSilicon], [MediaTek], [Panasonic], [Intel], [Samsung], [LGE], [Nokia], [vivo], etc., "WF on bandwidth part configuration", 3GPP TSG RAN WG1 Meeting #89, May 15-19, 2017, R1-1709265.
P.K. Liao, "LS on Bandwidth Part Operation In NR", 3GPP TSG-RAN WG1 NR Ad-Hoc#2, Jun. 27-30, 2017, R1-1711998.
Vivo, "Discussion on NR resource allocation," R1-1707238, 3GPP TSG RAN WG1 Meeting #89, Hangzhou, P.R. China, May 6, 2017, see sections 1-3; and figures 1-3.
Huawei et al., "On bandwidth part and bandwidth adaptation," R1-1706900, 3GPP TSG RAN WG1 Meeting #89, Hangzhou, China, May 6, 2017, see sections 1-6,1; and figure 3.
Ericsson, "On bandwidth parties," R1-1711565, 3GPP TSG RAN WG1 NR Ad-Hoc #2, Qingdao, P.R. China, Jun. 16, 2017, see sections 2.1-2.3.
Guangdong Oppo Mobile Telecom, "Bandwidth part configuration and frequency resource allocation," R1-1710164, 3GPP TSG RAN WG1 NR Ad-Hoc#2, Qingdao, P.R. China, Jun. 16, 2017, see sections 1-4.

* cited by examiner

METHOD AND APPARATUS FOR HANDLING MULTIPLE NUMEROLOGIES IN WIRELESS COMMUNICATION SYSTEM

This application is the National Stage filing under 35 U.S.C. 371 of International Application No. PCT/KR2018/007698, filed on Jul. 6, 2018, which claims the benefit of U.S. Provisional Application Nos. 62/529,450 filed on Jul. 6, 2017, and 62/557,125 filed on Sep. 11, 2017, the contents of which are all hereby incorporated by reference herein in their entirety.

TECHNICAL FIELD

The present invention relates to wireless communications, and more particularly, to a method and apparatus for handling multiple numerologies in a new radio access technology (NR) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In NR, different numerologies are supported. The numerology corresponds to one subcarrier spacing in the frequency domain. By scaling a reference subcarrier spacing by an integer N, different numerologies can be defined.

SUMMARY

Even though different numerologies are supported in NR, currently, different numerologies are not supported simultaneously. However, it may be discussed in near future to support different numerologies simultaneously.

In an aspect, a method for configuring a data subband set by a user equipment (UE) in a wireless communication system is provided. The method includes configuring at least one data subband set within a carrier, and communicating with a base station by using the at least one data subband set. Each of the at least one data subband set consists of at least one data subband, and each of the at least one data subband consists of a set of consecutive physical resource blocks (PRBs).

In another aspect, a user equipment (UE) in a wireless communication system is provided. The UE includes a memory, a transceiver, and a processor, coupled to the memory and the transceiver, that configures at least one data subband set within a carrier, and controls the transceiver to communicate with a base station by using the at least one data subband set. Each of the at least one data subband set consists of at least one data subband, and each of the at least one data subband consists of a set of consecutive physical resource blocks (PRBs).

Different numerologies can be supported simultaneously.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
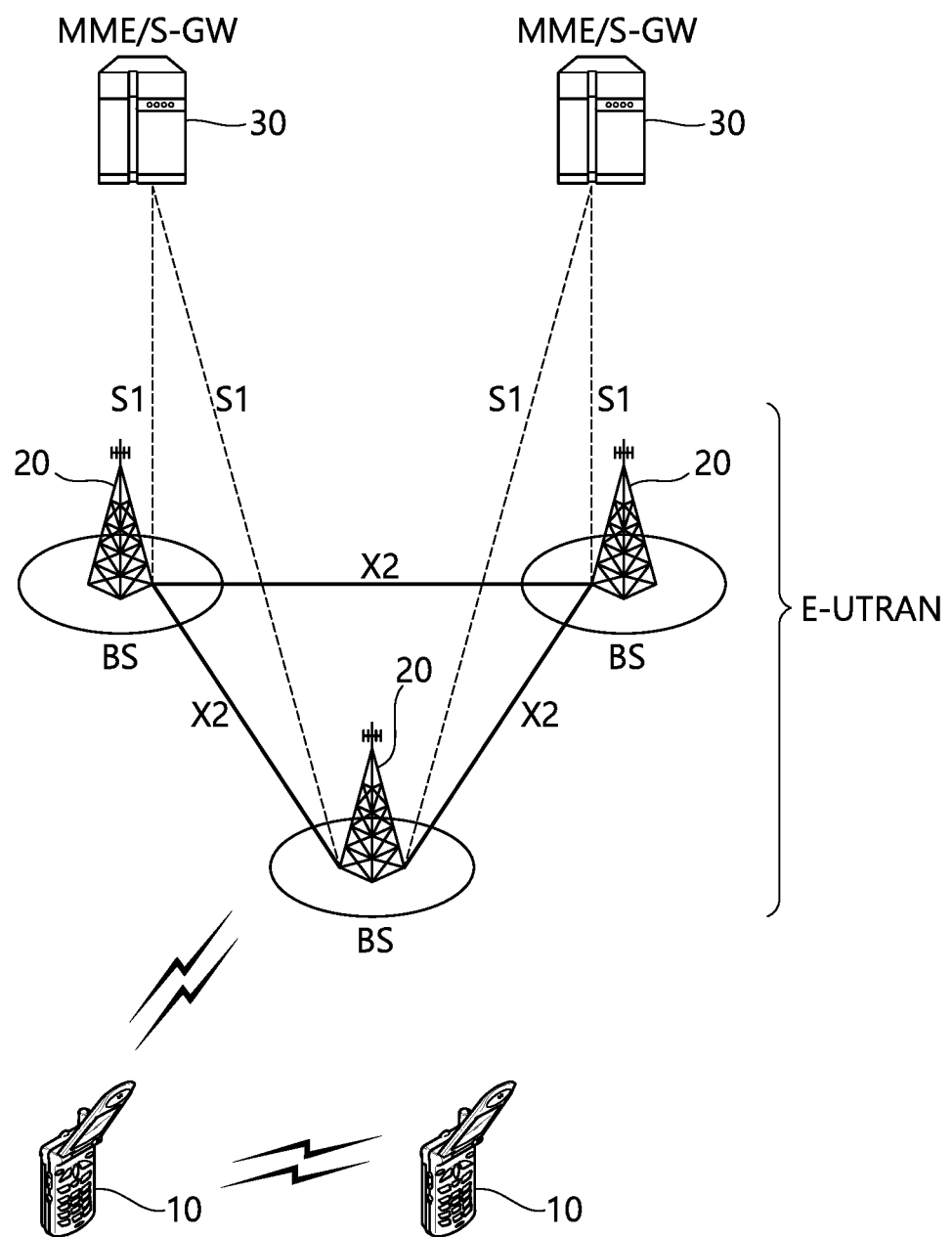
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
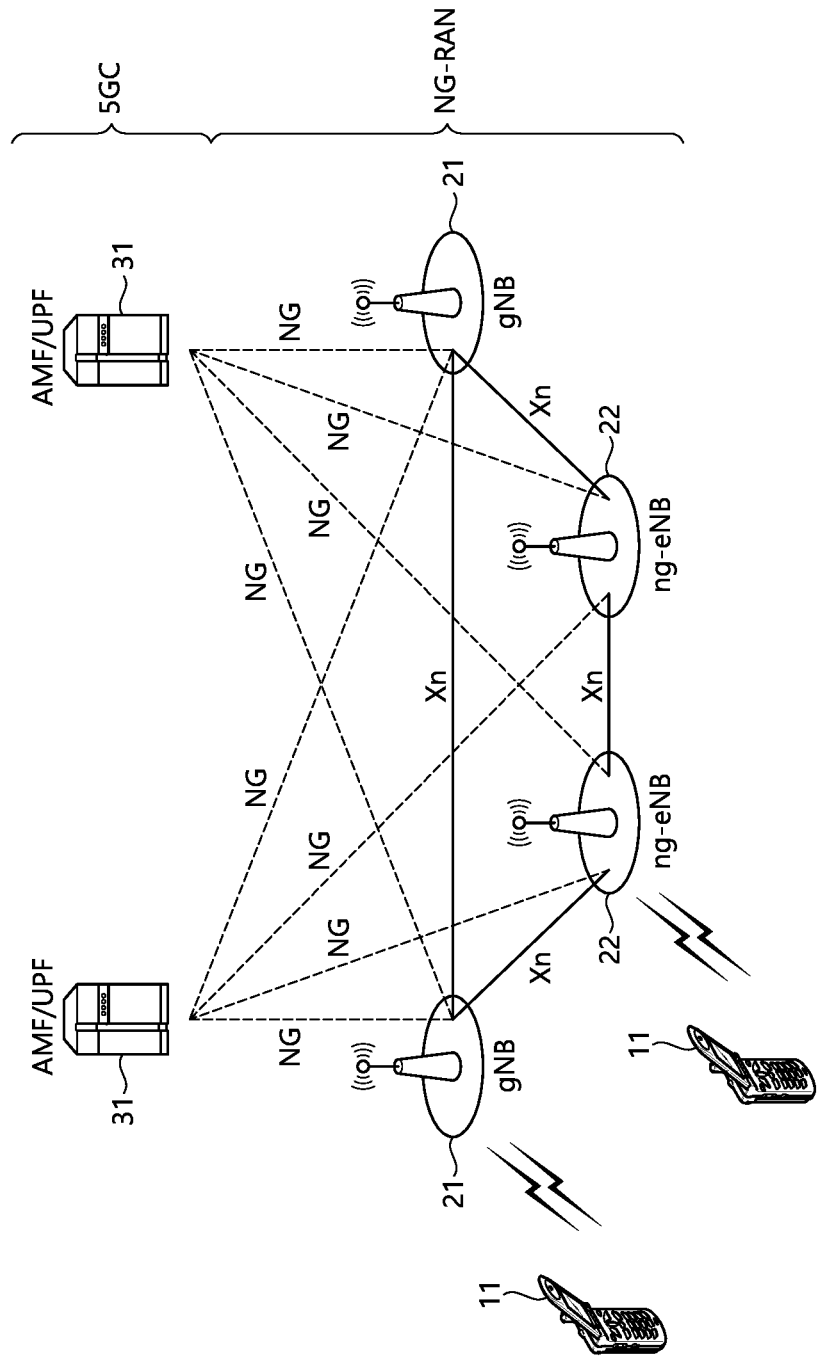
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index $\mu$. However, subcarrier spacings shown in Table 1 are merely exemplary, and specific subcarrier spacings may be changed. Therefore, each subcarrier spacing (e.g. $\mu$= 0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| $\mu$ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to $\mu=0$ is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbols in the present specification may refer to an OFDM/OFDMA symbol, or SC-FDMA symbol, etc. A CP may be located between each symbol.

Figure 3:
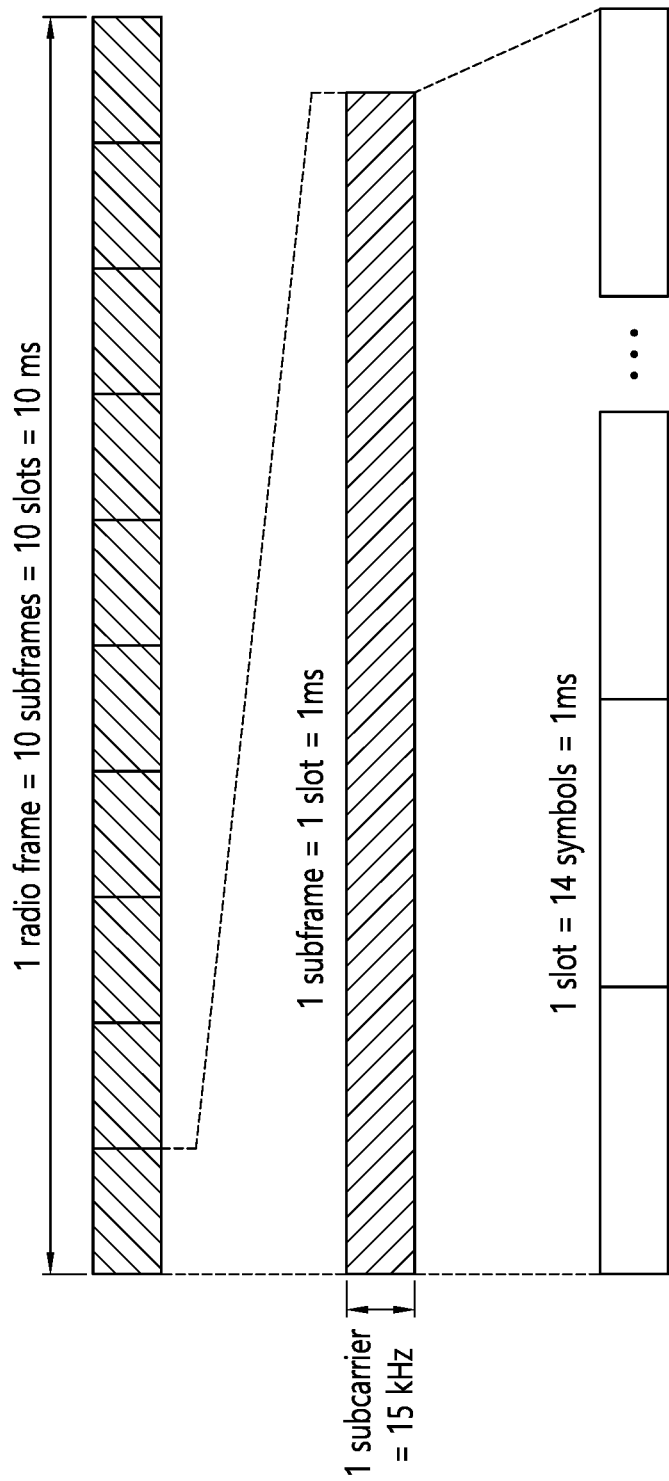
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to $\mu=0$.

Figure 4:
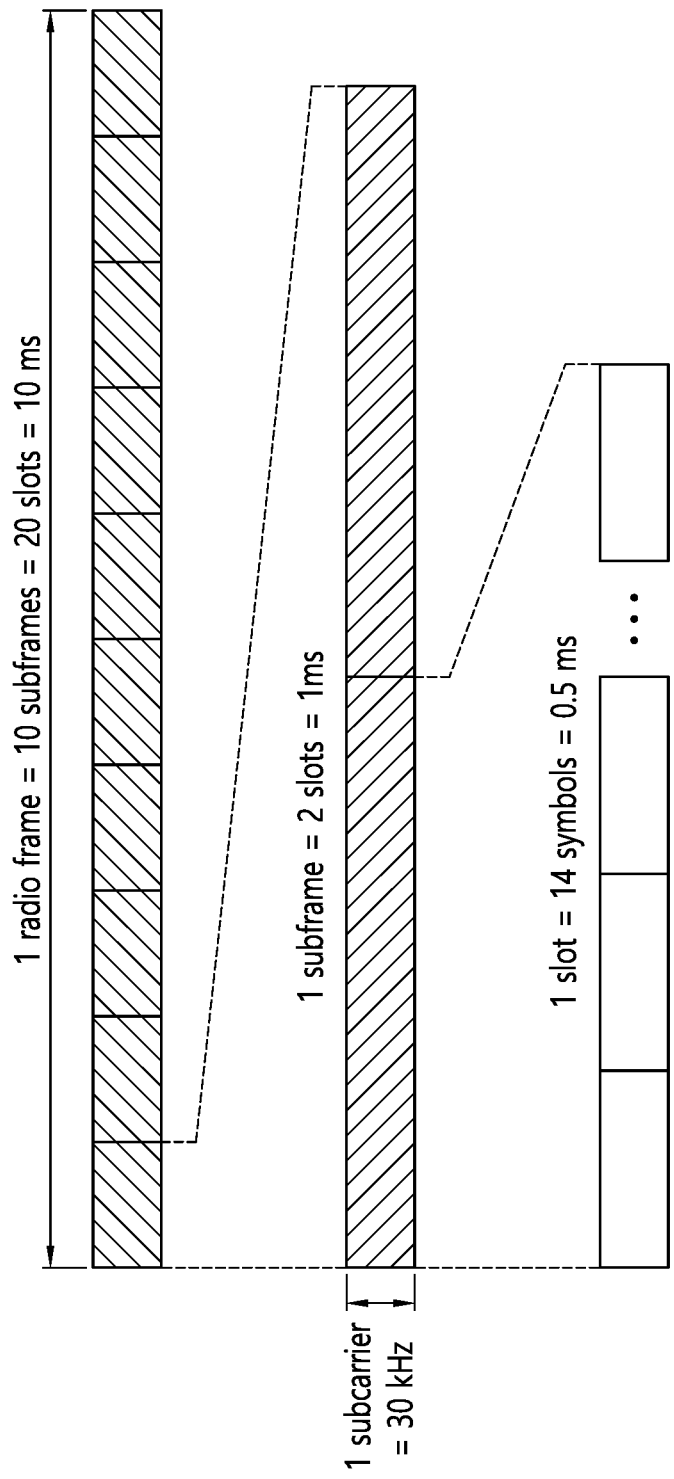
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to $\mu=1$.

Table 3 shows an example of a number of OFDM symbols per slot, slots per radio frame, and slots per subframe for extended CP.

TABLE 3

| $\mu$ | Number of symbols per slot | Number of slots per radio frame | Number of slots per subframe |
|---|---|---|---|
| 2 | 12 | 40 | 4 |

Meanwhile, a frequency division duplex (FDD) and/or a time division duplex (TDD) may be applied to a wireless system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| ... | ... | ... | ... | ... | ... | ... | ... | ... | ... | ... | ... | ... | ... | ... |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
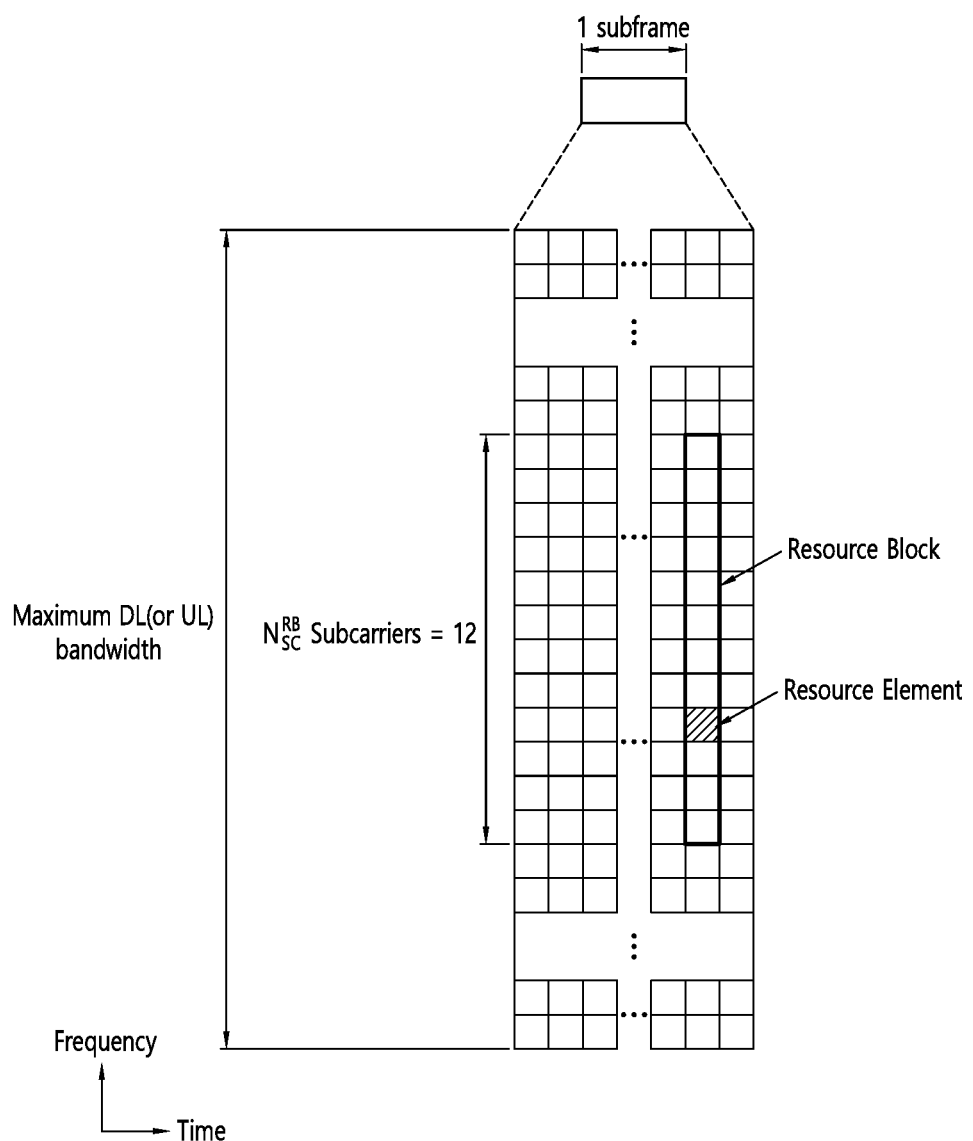
FIG. 5 shows an example of a resource grid to which technical features of the present invention can be applied.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "$\mu$", "$14.2\mu$" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("$\mu$"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
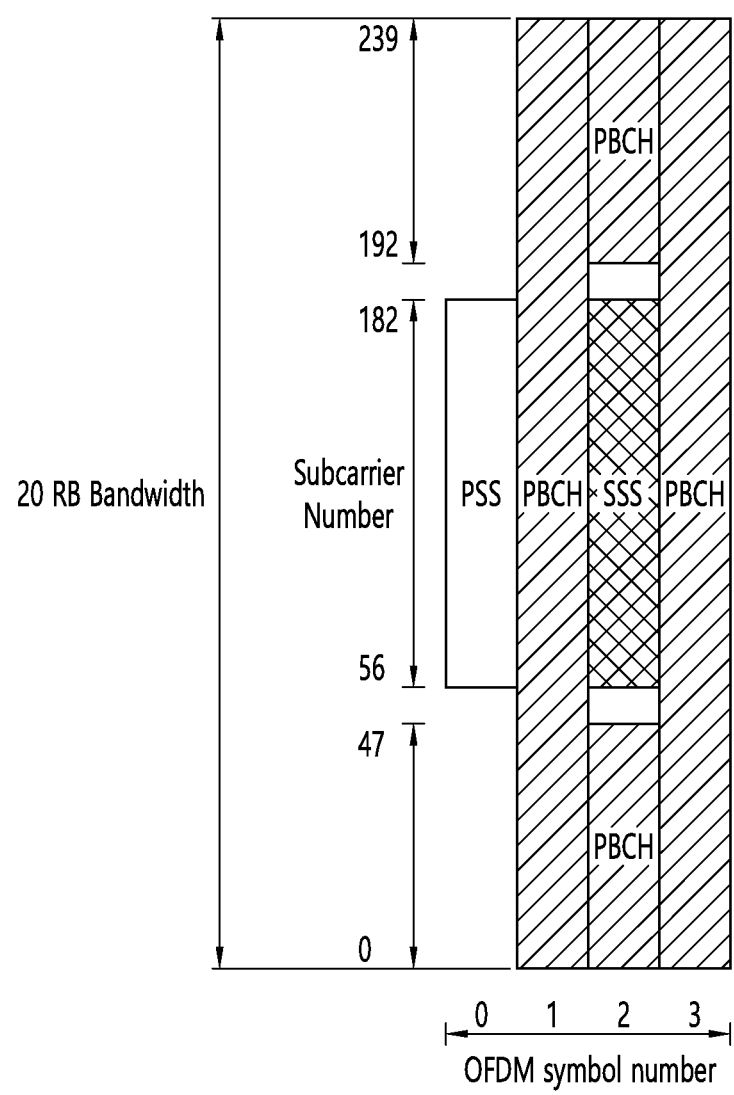
FIG. 6 shows an example of a synchronization channel to which technical features of the present invention can be applied.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB #L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the COREST may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
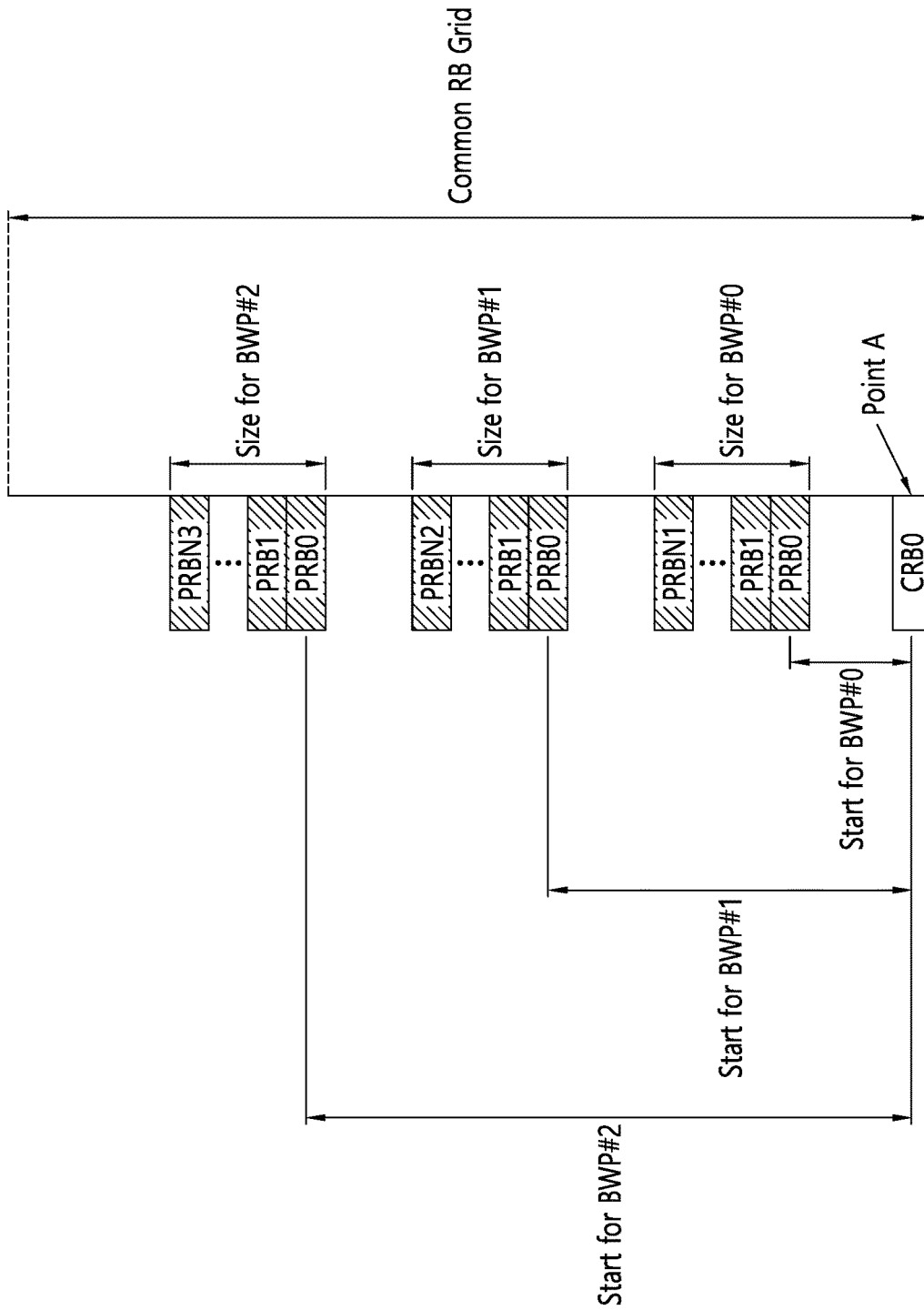
FIG. 7 shows an example of a frequency allocation scheme to which technical features of the present invention can be applied.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
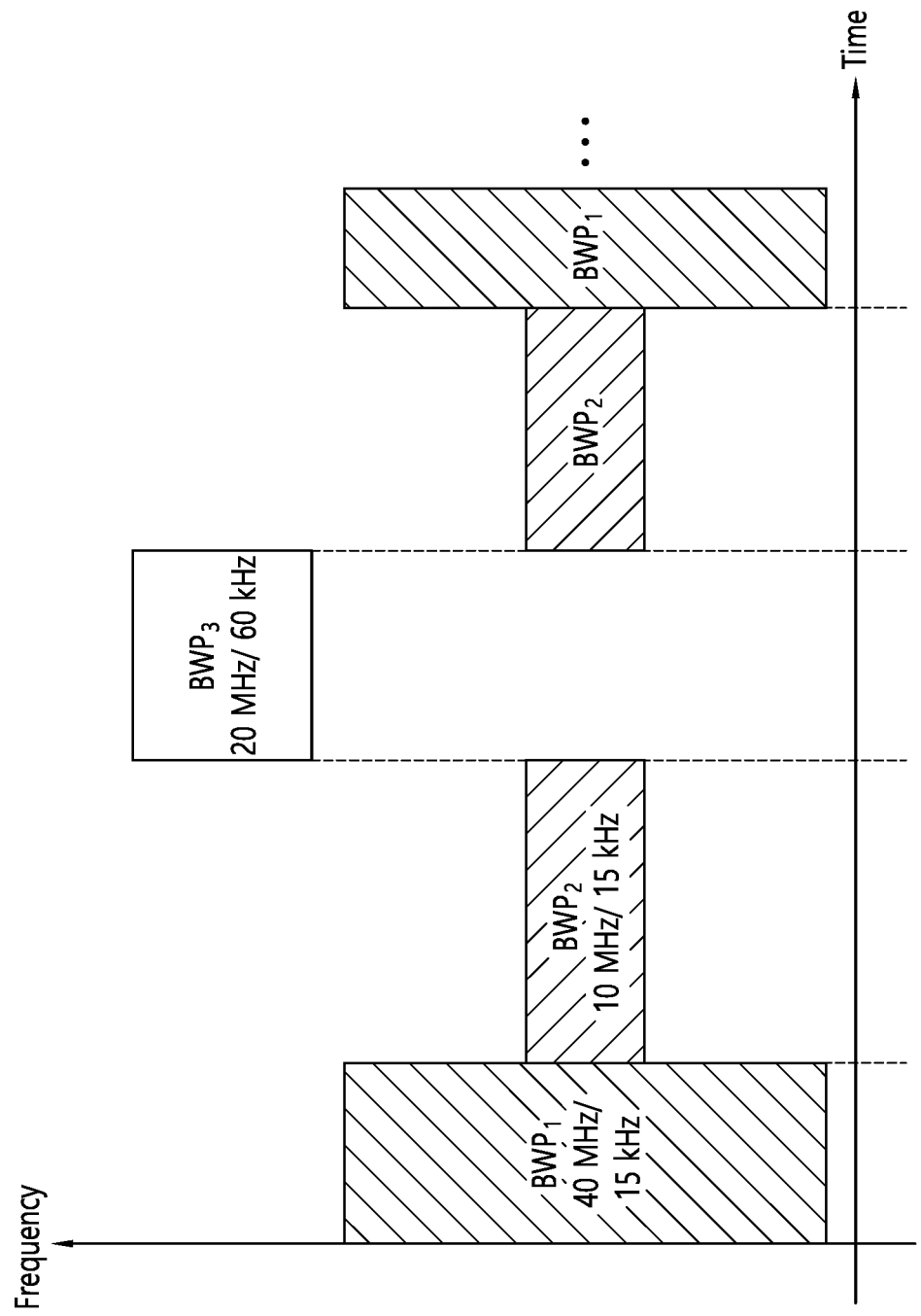
FIG. 8 shows an example of multiple BWPs to which technical features of the present invention can be applied.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Hereinafter, various embodiments of the present invention is described.

1. Handling Multiple Numerologies

When a UE can support multiple numerologies simultaneously, multiple numerologies can be supported simultaneously as follows.

(1) Multiple numerologies may be multiplexed by semi-static frequency division multiplexing (FDM). In this case, a UE may be configured with at least one data subband set. The data subband corresponds to BWP described above. That is, a UE may be configured with at least one BWP set. In the description below. The data subband set and the BWP set may have the same meaning. The data subband set and the BWP may have the same configuration (e.g. a numerology used in the set and a set of contiguous PRBs). The data subband set may define a set of PRBs in which a UE may be configured/scheduled with the given numerology. The data subband set may be configured per each numerology.

Figure 9:
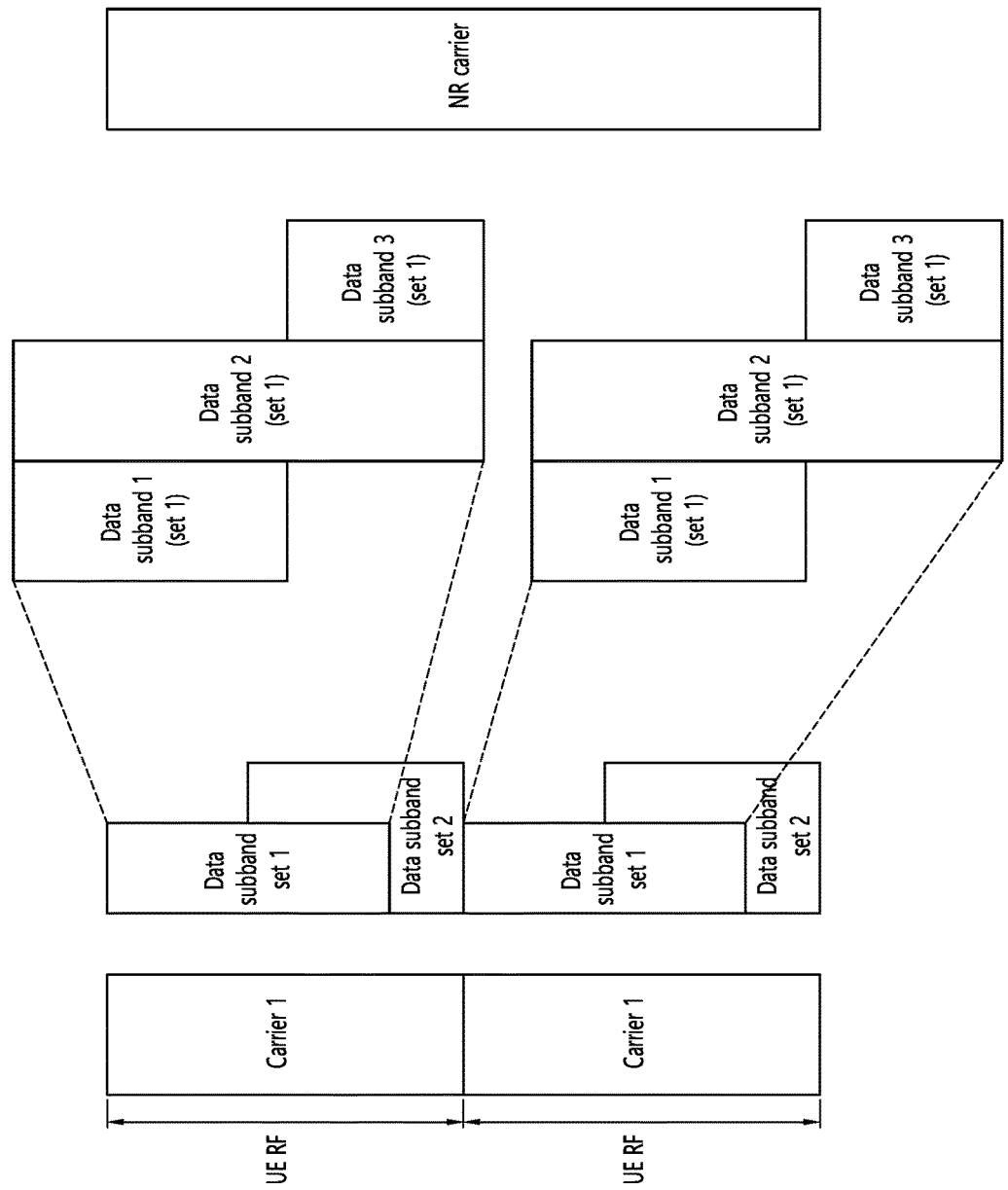
FIG. 9 shows an example of a data subband set according to an embodiment of the present invention.

FIG. 9 shows an example of a data subband set according to an embodiment of the present invention. Referring to FIG. 9, data subband set 1 consists of data subband 1, data subband 2 and data subband 3. Data subband set 1 may correspond to numerology 1. Further, data subband set 1 and data subband set 2 are configured within a bandwidth covered by a single radio frequency (RF). In this case, data subband set 1 and data subband set 2 may be overlapped partially or fully. Data subband set 2 may correspond to numerology 2. Numerology 1 and numerology 2 may be identical or different from each other.

Whether data subbands which are partially or fully overlapped can be activated at the same time may depend on UE capability. At least one data subband or BWP from each data subband set may be activated. A UE may report whether the UE can support numerology in a disjoint manner or overlapped manner, when the UE supports multiple numerologies or multiple active BWPs simultaneously.

(2) Instead of defining data subband set, different numerologies or same numerology may be configured by BWPs. One or more of BWPs may be activated simultaneously depending on UE capability. In this case, in terms of scheduling, either separate scheduling per activated BWP or joint scheduling across activated BWPs may be indicated semi-statically or dynamically.

In terms of scheduling, the following mechanisms may be considered.

(1) Self-data-subband scheduling: In this case, CORESET associated with the data subband may be used for scheduling. The numerology used for CORESET and the numerology used for data subband may be same. Also, the bandwidth of CORESET and frequency location of CORESET may belong to the bandwidth/frequency of data subband. In other words, CORESET itself is contained in the data subband.

(2) Cross-data-subband scheduling: Cross-data-subband scheduling from another data subband may be allowed. In this case, the numerology used for CORESET and the numerology used for CORESET data subband may be different. In terms of cross-data-subband scheduling, the following two approaches may be considered.

Semi-static configuration of cross-data-subband scheduling: Data subband or CORESET for cross-data-subband scheduling is semi-statically configured. If a UE-specific carrier A is configured with cross-carrier scheduling for another UE-specific carrier B, BWPs in carrier A may schedule any BWPs in carrier B. For example, referring to FIG. 9, data subband set 1 in carrier 1 may be configured to support cross-data-subband scheduling for data subband set 2 in carrier 2. If carrier A has more than one active BWPs, either each BWP may schedule any BWP in carrier B or further semi-static configuration between data subband set (or BWP set) for cross-data-subband scheduling may be indicated. In either way, when data subband with the same numerology changes over time, cross-data-subband/cross-carrier scheduling properties can be maintained. For example, even if a UE has only one active BWP per carrier, if carrier A schedules carrier B, any data subband or CORESET associated with carrier A may schedule any data subband in carrier B. In other words, based on UE monitoring on CORESET in carrier A, cross-carrier CORESET may be change. Further, a carrier indicator field (CIF) value may be defined per data subband set per each carrier. Alternatively, separate field to indicate data subband set(s) in each carrier may be indicated dynamically or semi-statically.

Dynamic indication of cross-data-subband scheduling via scheduling: While cross-carrier scheduling is semi-statically configured, cross-data-subband scheduling may be indicated dynamically by DCI. When cross-carrier scheduling is configured, it may need to be known which CORESET(s) can be used for cross-carrier scheduling. For this, one or more CORESETs may be configured in cross-carrier scheduling which can be used for cross-carrier scheduling. Or, one or more BWPs may be configured in cross-carrier scheduling, and the associated CORESET to the configured BWP may be used for cross-carrier scheduling. Or, any CORESET in carrier A may schedule any data subband in carrier B if cross-carrier scheduling by carrier A for carrier B is configured. Cross-carrier scheduling may be done by CIF type of indication, whereas indication of data subband within a carrier may be done by indicating BWP index in DCI. When cross-data-subband scheduling is used, a set of BWPs indicatable by one DCI may be higher layer configured per each CORESET or per each BWP.

Figure 10:
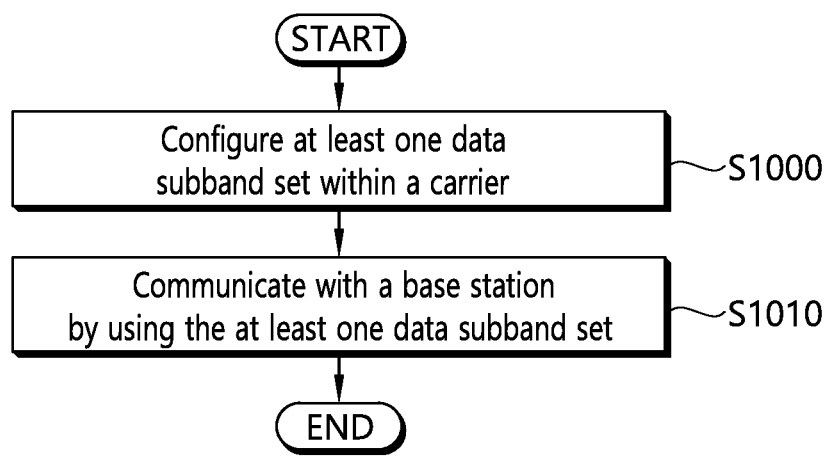
FIG. 10 shows a method for configuring a data subband set by a UE according to an embodiment of the present invention.

FIG. 10 shows a method for configuring a data subband set by a UE according to an embodiment of the present invention. The present invention described above may be applied to this embodiment.

In step S1000, the UE configures at least one data subband set within a carrier. Each of the at least one data subband set consists of at least one data subband, i.e. BWP. Each of the at least one data subband consists of a set of consecutive PRBs. In step S1010, the UE communicates with a base station by using the at least one data subband set.

Each of the at least one data subband set may be configured per numerology. The at least one data subband may include CORESET for scheduling in the at least one data subband. Or, a first data subband among the at least one data subband may schedule a second data subband among the at least one data subband.

The at least one data subband set may include multiple data subband sets. The multiple data subband sets may be multiplexed by FDM. The multiple data subband sets may be partially or fully overlapped with each other. The multiple data subband sets may be covered by a single RF of the UE. Numerologies for the multiple data subband sets may be identical or different. Each of the multiple data subband sets may include an activated data subband. A first data subband in a first data subband sets among the multiple data subband sets may schedule a second data subband in a second data subband sets among the multiple data subband sets.

2. Measurement Related Features (1) Radio Resource Management (RRM)/Beam Management Related Measurement When multiple BWPs can be activated, handling of RRM needs to be clarified. The following approaches may be considered.

A numerology used for RRM may be determined by RRM measurement configuration, and a UE may monitor bandwidth/frequency location configured for RRM measurement configuration regardless of active/configured BWPs at a given time. Data may be skipped in scheduling if conflict occurs or a UE is allowed not to monitor data with different numerology in the measurement time. In this case, RRM measurement bandwidth may be configured larger than any BWP configuration, since a UE may have larger RF to support multiple active BWPs.

Different numerologies may be used for RRM per each data subband set, and a UE may perform RRM measurement per each data subband set. In other words, separate RRM measurement configuration may be considered per each data subband set.

Figure 11:
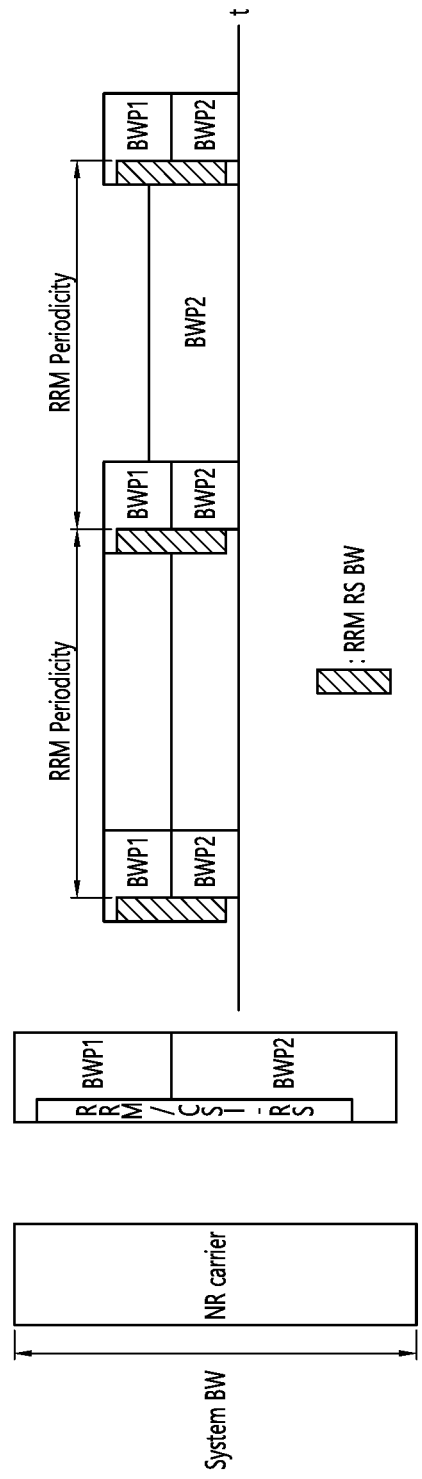
FIG. 11 shows an example of RRM measurement bandwidth and data bandwidth according to an embodiment of the present invention.

FIG. 11 shows an example of RRM measurement bandwidth and data bandwidth according to an embodiment of the present invention. Referring to FIG. 11, RRM measurement bandwidth and data bandwidth may be changed over time.

In terms of RRM measurement, outside of BWP may be considered as inter-frequency measurement, and the measurement may be performed based on measurement gap.

(2) CSI Measurement

Similar to RRM, CSI measurement may utilize the same numerology to the data/control transmission. In this sense, CSI measurement may occur within each BWP. Wideband CSI feedback may occur within each data subband set. Subband CSI feedbacks may occur within each BWP, and subband size may be different per each data subband set.

Within each data subband set, if the frequency location and bandwidth changes, the overlapped portion may be reused between BWP switching. In other words, if two BWPs within each data subband set has overlapped portion, measurement from the overlapped portion may be reused.

Data subband set may be equivalent to a UE-specific carrier. Different data subband set may be multiplexed by time division multiplexing (TDM) when only one active BWP is allowed.

3. Details of RRM and CSI Related Configuration in Wideband Operation

There was a discussion in terms of handling RRM/CSI measurement which can be configured outside of active BWP. When a UE needs to switch from current active BWP for measurement, two options may be considered. First option is to switch active BWP aligned with measurement configuration. This option may allow continuous data reception/transmission. Yet, this option also lead frequent BWP switching, and thus, may lead overhead to handle BWP switching procedure. The second option is to treat that measurement can occur within a measurement gap, and thus a UE may not be required to monitor CORESET during the measurement outside of active BWP.

While the second option is preferred to the first option, measurement configurations for RRM and/or CSI feedback may be configured independently from BWP configurations according to the second option. Though it may be considered to use BWP configuration framework even for measurement configuration, as each BWP has its associated CORESET and a UE is not required to monitor CORESET during the measurement gap, it may be more straightforward to configure measurement configurations independently from BWP configurations. In this case, there is no need to explicitly tie measurement gap configuration to one or more of BWP configurations.

In terms of measurement frequency outside of active BWP, further clarification may be necessary considering UE maximum supported bandwidth and multiple RF capabilities.

Overall, there are three cases for the relationship between measurement bandwidth/frequency and active BWP. If the measurement bandwidth is located within its active BWP, there is no issue to perform measurement, and thus, that case is not discussed here.

(1) Case 1: In order to minimize UE service interruption, it can be considered to open up its RF to include both measurement bandwidth and active BWP. If a UE opens up its RF, both measurement and communication via active BWP can be performed simultaneously. The UE does not have extra RF for the measurement. For example, if a UE opens up its RF without changing its center frequency, both measurement and communication via active BWP can be performed simultaneously. As a UE is not expected to receive or transmit anything outside of its active BWP, it may be necessary to expand its active BWP to realize this option. Then, similar issue to a mechanism of switching active BWP may occur. Furthermore, if a UE needs to retune its center frequency to accommodate both measurement bandwidth and active BWP, the retuning latency is not negligible. In this sense, a simple solution may be to assume this case as 'outside of active BWP'. If a UE can increase it's RF to include RRM frequency without any change of active BWP, a UE may not need measurement gap. To reflect this, a UE may report whether measurement gap is needed or not per each BWP configuration. For a BWP which does not require measurement gap, the network may assume that a UE can receive/transmit while performing measurements.

(2) Case 2: The configured measurement frequency/bandwidth may be beyond the UE's RF capability if UE still needs to monitor active BWP. This case may be considered as 'outside of active BWP', and should be handled with measurement gap.

(3) Case 3: A UE may be equipped with multiple RFs, and one or more RFs may be used for measurements while the UE monitors active BWP. In this case, extra RF may be used for the measurement, and in this case, a UE may report its capability whether it needs to have measurement gap or not similar to LTE.

In summary, measurement gap may be necessary if measurement bandwidth is outside of active BWP. Furthermore, a UE may need to retune or expand its RF for the current active BWP for the measurement.

Similar mechanism may be considered for sounding reference signal (SRS).

In terms of measurement gap configuration, the duration of the measurement gap may be determined based on the measurement duration and necessary retuning gap. Different retuning gap may be necessary depending on the cases. For example, if a UE needs to perform measurement in Case 1 mentioned above, and if a UE does not need to switch its center frequency, the retuning gap may be small, such as 20 us. However, the network may not know whether the UE needs to switch its center frequency or not to perform measurement. Accordingly, each UE may indicate the necessary retuning gap for each measurement configuration. Furthermore, the necessary gap may also depend on the current active BWP, which may be dynamically switched via switching mechanism. Thus, each UE may also need to dynamically indicate the necessary gap. Alternatively, the needed retuning latency and/or the need of measurement gap may be reported per each measurement configuration and/or BWP configuration. In general, it may be indicated per configured BWP for each intra and inter-frequency measurement.

Alternatively, the measurement gap may be implicitly created. Specifically, the network may configure a certain gap. The certain gap may include the smallest retuning latency. For example, in Case 1 mentioned above, the network may assume that small retuning gap is necessary if both measurement bandwidth and active BWP can be included within UE maximum RF capability, assuming that center frequency of current active BWP is not changed. If a UE needs more gap than the configured certain gap, the UE may skip receiving or transmitting.

Different measurement gap and retuning latency may be used for RRM and CSI, respectively. For CSI measurement, if periodic CSI measurement outside of active BWP is configured, a UE may need to perform its measurement periodically per measurement configuration. However, for RRM, it may be up to UE implementation where to perform the measurement, as long as it satisfies the measurement requirements. Thus, in such case, it may be desirable to assume retuning latency of worst case for each measurement. However, as the retuning latency is quite different between intra-band and inter-band retuning, separate measurement gap configuration between intra-band and inter-band measurement may be considered.

In summary, in terms of retuning gap for the measurement gap for RRM measurement, measurement gap configurations for intra-band measurement and inter-band measurements may be configured separately. In measurement gap duration, the worst retuning latency with measurement duration may be assumed.

Further, in terms of retuning gap for the measurement gap for CSI measurement, the following options may considered.

Option 1: The worst case retuning gap may be assumed.

Option 2 for each BWP configuration: A UE may report its necessary retuning gap for a measurement gap.

Option 3: The network may configure retuning gap, and if needed, additional gap may be created by not receiving or transmitting data.

4. BWP Activation/Deactivation

Implicit DCI may be used to activate/deactivate a BWP, and further details may need to be discussed. When a UE is configured with N BWPs, it may need to be clarified whether all N BWPs can be dynamically switched via DCI or only a subset of N BWPs can be dynamically switched. In order to minimize DCI overhead or limit the maximum number of configurable BWPs, it may be preferred that only a subset of N BWPs can be dynamically switched.

Semi-static configuration may also switch active BWP which may not need to be also dynamically switched. Furthermore, there may be BWP which is used according to timer (e.g. default BWP). In this sense, the subset of BWP configurations which can be dynamically switched may be indicated. As, so far, the motivation of BWP adaptation is to adopt minimum and maximum bandwidth that the UE supports for power efficient mode and high data rate use cases, the maximum number of BWP configurations may be limited to 2 for DL and UL, respectively. One BWP may be default BWP, and the other BWP may be higher layer configured.

In summary, the number of BWPs indicated by DCI may be restricted to 2 or 4 (1 or 2 bit DCI overhead). To achieve this, the number of configured BWPs may be restricted or a subset of configured BWPs which can be dynamically switched may configured.

Furthermore, a timer may be used for switching active BWP to the default BWP (or other smaller BWP). Regarding this mechanism, discontinuous reception (DRX)-like mechanism may also be used for active BWP switching. For example, a UE may be configured with two BWPs. One BWP may be targeted for power efficient state and another BWP may be targeted for active state in DRX-like mechanism. In power efficient state, a UE may activate small BWP for both control and data. The transition between power efficient state and active state may be done similar to DRX or may be semi-statically changed.

Figure 12:
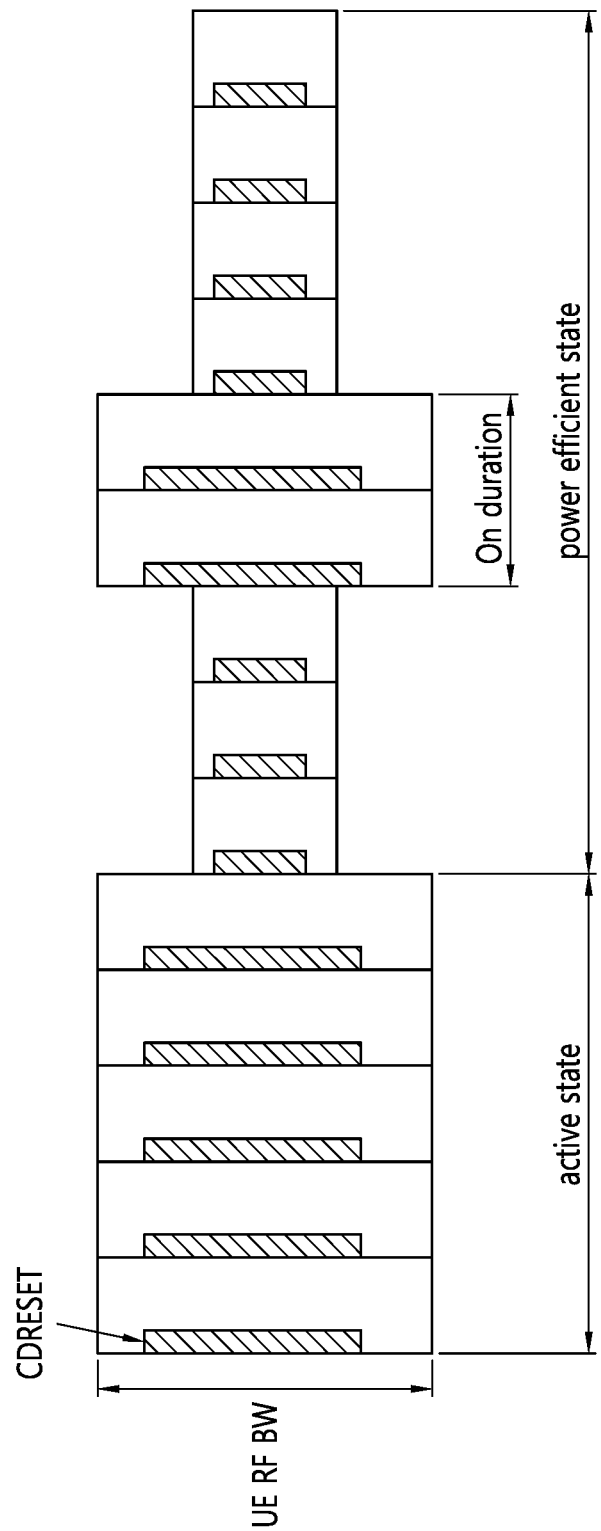
FIG. 12 shows an example of DRX-like BWP switching mechanism according to an embodiment of the present invention.

FIG. 12 shows an example of DRX-like BWP switching mechanism according to an embodiment of the present invention. Referring to FIG. 12, during the power efficient state, a UE may switch active BWP to larger BWP during On-Duration. If there are data scheduled for the larger BWP, the UE may transit to the active state, then the UE may active larger BWP. Otherwise, the UE may go back to the power efficient state. Or, during OnODuration, a UE may monitor smaller BWP or default BWP, and may switch to larger BWP once the UE detects active scheduling by the network. Similarly, for UL, the UE may switch to larger BWP after the UE transmits buffer status report (BSR) (or possibly based on threshold of BSR).

5. Default DL/UL BWP

The initial active DL/UL BWP may be considered as default DL/UL BWP. It may be discussed whether the UE returns to default DL/UL BWP when a certain condition(s) are met. For example, if a UE does not receive control for a long time, then the UE may fallback to default BWP. However, the necessity of fallback may also depend on the design of BWP configurations. In terms of configuring multiple BWPs, the following options can be considered.

(1) All BWPs including default BWP may share at least one CORESET. In other words, CORESET for RMSI may be shared for all configured BWPs. Thus, without going back to another BWP or default BWP, the UE may always be able to receive control information via the common CORESET. To minimize the ambiguity of resource allocation, the common CORESET may schedule data within only default BWP. This means that frequency region of default BWP can belong to all the configured BWPs. However, this may not address effectively if different numerologies are used between default BWP and other BWPs.

(2) When the configured BWP uses different numerology from default BWP, semi-static pattern of BWP switching to default BWP may be considered. For example, to check RMSI at least periodically, switching to default BWP may be considered. This can be necessary particularly when BWPs use different numerologies. That is, when more than one numerologies are supported by a UE, and a UE can be configured with BWPs with different numerologies, a semi-static time-pattern to allow switching to default DL/UL BWP may be considered. For BWP with the same numerology to that of default BWP, at least one common CORESET between each BWP and default BWP may be supported.

More generally, a TDM pattern or a set of resources in which each BWP is used may be configured. The TDM pattern or the set of resources may be configured with multiple patterns or multiple set of resources associated with each BWP. For example, subset of resources accessing default BWP may be configured. For UL, when transmitting physical random access channel (PRACH), the UE may automatically change its BWP to default BWP. Though the numerology used for PRACH is different from the numerology used for Msg3 in the default BWP, the numerology used for the default BWP may be determined by numerology used for Msg3 and PRACH may be exceptionally transmitted from the default BWP. Overall, the numerology used for SRS or PRACH may be different from configured UL BWP, and it is not considered that a UE is outside of active BWP as long as the frequency region is same. Also, when a UE needs to switch its beam direction to receive or transmit certain signals while keeping the same frequency, changing active BWP may not be considered. However, data transmission may not occur when the UE switches its numerology and transmits from its current active BWP.

Figure 13:
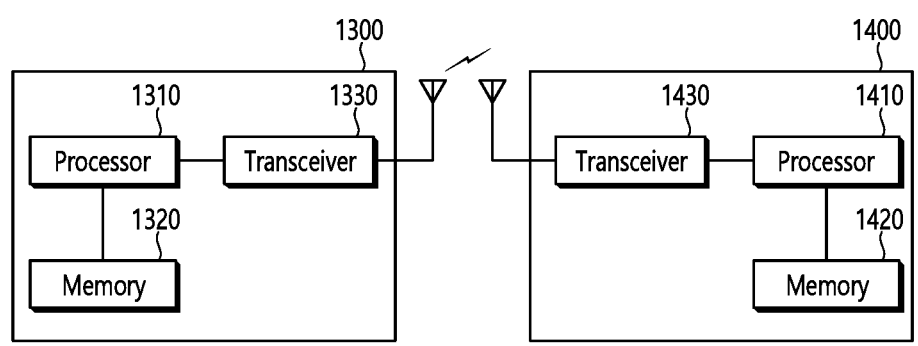
FIG. 13 shows a wireless communication system to implement an embodiment of the present invention.

FIG. 13 shows a wireless communication system to implement an embodiment of the present invention.

A UE 1300 includes a processor 1310, a memory 1320 and a transceiver 1330. The processor 1310 may be configured to implement proposed functions, procedures and/or methods described in this description. Layers of the radio interface protocol may be implemented in the processor 1310. The memory 1320 is operatively coupled with the processor 1310 and stores a variety of information to operate the processor 1310. The transceiver 1330 is operatively coupled with the processor 1310, and transmits and/or receives a radio signal.

A network node 1400 includes a processor 1410, a memory 1420 and a transceiver 1430. The processor 1410 may be configured to implement proposed functions, procedures and/or methods described in this description. Layers of the radio interface protocol may be implemented in the processor 1410. The memory 1420 is operatively coupled with the processor 1410 and stores a variety of information to operate the processor 1410. The transceiver 1430 is operatively coupled with the processor 1410, and transmits and/or receives a radio signal.

The processors 1310, 1410 may include application-specific integrated circuit (ASIC), other chipset, logic circuit and/or data processing device. The memories 1320, 1420 may include read-only memory (ROM), random access memory (RAM), flash memory, memory card, storage medium and/or other storage device. The transceivers 1330, 1430 may include baseband circuitry to process radio frequency signals. When the embodiments are implemented in software, the techniques described herein can be implemented with modules (e.g., procedures, functions, and so on) that perform the functions described herein. The modules can be stored in memories 1320, 1420 and executed by processors 1310, 1410. The memories 1320, 1420 can be implemented within the processors 1310, 1410 or external to the processors 1310, 1410 in which case those can be communicatively coupled to the processors 1310, 1410 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for configuring a data subband set by a user equipment (UE) in a wireless communication system, the method comprising:

configuring at least one data subband set within a carrier; and communicating with a base station using the at least one data subband set, wherein each of the at least one data subband set comprises at least one data subband, and wherein a maximum number of the at least one data subband is 4 and only one data subband among the at least one data subband is an active data subband, wherein each of the at least one data subband comprises a set of consecutive physical resource blocks (PRBs), wherein each of the at least one data subband set is configured per numerology, wherein based on at least two data subband sets and based on overlapping data subbands belonging to different overlapped data subband sets, the UE transmits UE capability information informing the base station whether the overlapping data subbands are capable of simultaneous activation by the base station, wherein based on a request that the UE report a channel state information (CSI) measurement for each of the overlapping data subbands, the UE performs the CSI measurement for one of the overlapping data subbands and reuses a result of the CSI measurement for remaining overlapping data subbands, wherein the at least one data subband includes a control resource set (CORESET) for scheduling in the at least one data subband, wherein based on the CSI measurement being requested outside of the active data subband, the UE reports a necessary retuning gap to the base station based on the request of the CSI measurement, and performs the CSI measurement within a measurement gap and does not monitor the CORESET for the active data subband during the CSI measurement, and wherein the UE receives information on the measurement gap which is determined based on the necessary retuning gap from the base station, where the measurement gap is determined per each of the at least one data subband.

2. The method of claim 1, wherein a CORESET associated with a first data subband among the at least one data subband schedules a second data subband.

3. The method of claim 1, wherein the at least one data subband set includes multiple data subband sets.

4. The method of claim 3, wherein the multiple data subband sets are multiplexed by frequency division multiplexing (FDM).

5. The method of claim 3, wherein the multiple data subband sets are partially or fully overlapped with each other.

6. The method of claim 3, wherein the multiple data subband sets are covered by a single radio frequency (RF) of the UE.

7. The method of claim 3, wherein numerologies for the multiple data subband sets are identical.

8. The method of claim 3, wherein a CORESET associated with a first data subband in a first data subband set among the multiple data subband sets schedules a second data subband in a second data subband set among the multiple data subband sets.

9. The method of claim 1, wherein the UE is in communication with at least one of a mobile device, a network, or autonomous vehicles other than the UE.

10. A user equipment (UE) in a wireless communication system, the UE comprising:
- a memory;
- a transceiver; and
- a processor, operatively coupled to the memory and the transceiver, that:
  - configures at least one data subband set within a carrier; and
  - communicates with a base station using the at least one data subband set, wherein each of the at least one data subband set comprises at least one data subband, and wherein a maximum number of the at least one data subband is 4 and only one data subband among the at least one data subband is an active data subband, wherein each of the at least one data subband comprises a set of consecutive physical resource blocks (PRBs), wherein each of the at least one data subband set is configured per numerology, wherein based on at least two data subband sets and based on overlapping data subbands belonging to different overlapping data subband sets, the UE transmits UE capability information informing the base station whether the overlapping data subbands are capable of simultaneous activation by the base station, wherein based on a request that the UE a report channel state information (CSI) measurement for each of the overlapping data subbands, the UE performs the CSI measurement for one of the overlapping data subbands and reuses a result of the CSI measurement for remaining overlapping data subbands, wherein the at least one data subband includes a control resource set (CORESET) for scheduling in the at least one data subband, wherein based on the CSI measurement being requested outside of the active data subband, the UE reports a necessary retuning gap to the base station based on the request of the CSI measurement, and performs the CSI measurement within a measurement gap and does not monitor the CORESET for the active data subband during the CSI measurement, and wherein the UE receives information on the measurement gap which is determined based on the necessary retuning gap from the base station, where the measurement gap is determined per each of the at least one data subband.

* * * * *